United States Patent [19]
Bickley et al.

[11] Patent Number: 4,739,518
[45] Date of Patent: Apr. 19, 1988

[54] RECEIVER INTERFERENCE SUPPRESSION SYSTEM

[75] Inventors: Robert H. Bickley, Scottsdale; Christopher D. Broughton, Mesa; John T. Knudsen, Scottsdale, all of Ariz.

[73] Assignee: Motorola, Inc., Schaumburg, Ill.

[21] Appl. No.: 866,002

[22] Filed: May 22, 1986

[51] Int. Cl.⁴ .................................................. H04B 1/10
[52] U.S. Cl. ...................................... 455/296; 455/303; 455/308; 455/311; 455/305
[58] Field of Search ................... 455/296, 303–305, 455/308, 311; 328/165; 330/124 R

[56] References Cited

U.S. PATENT DOCUMENTS

| | | | |
|---|---|---|---|
| 2,394,544 | 2/1946 | Gottier | 455/305 |
| 3,911,366 | 10/1975 | Baghdady | 455/303 |
| 4,053,932 | 10/1977 | Yamaguti et al. | 455/305 |
| 4,088,955 | 5/1978 | Baghdady | |
| 4,135,159 | 1/1979 | Kubanoff | 455/305 |
| 4,249,261 | 2/1981 | Ogita | 455/305 |
| 4,270,223 | 5/1981 | Marston | 455/305 |
| 4,328,591 | 5/1982 | Baghdady | 455/303 |
| 4,361,881 | 11/1982 | Clemens | 455/303 |

Primary Examiner—Michael A. Masinick
Attorney, Agent, or Firm—Maurice J. Jones, Jr.

[57] ABSTRACT

A radio receiver circuit which suppresses an interfering signal exhibiting an amplitude significantly greater than that of a desired signal and a frequency nearly the same as that of the desired signal is disclosed. A received signal is applied to a gain controlled amplifier and a limiter. The limiter provides a limited signal which reduces amplitude and power of the desired signal relative to the interfering signal. The gain controlled amplifier provides a constant amplitude signal at an amplitude where the interfering signal portion of the constant amplitude signal equals an amplitude of the interfering signal portion of the limited signal. The constant amplitude and limited signals combine through a subtraction operation resulting in a significant attenuation of the interfering signal while causing only a small attenuation of the desired signal. Switching and decision circuitry are provided to selectively utilize the interference suppression.

16 Claims, 3 Drawing Sheets

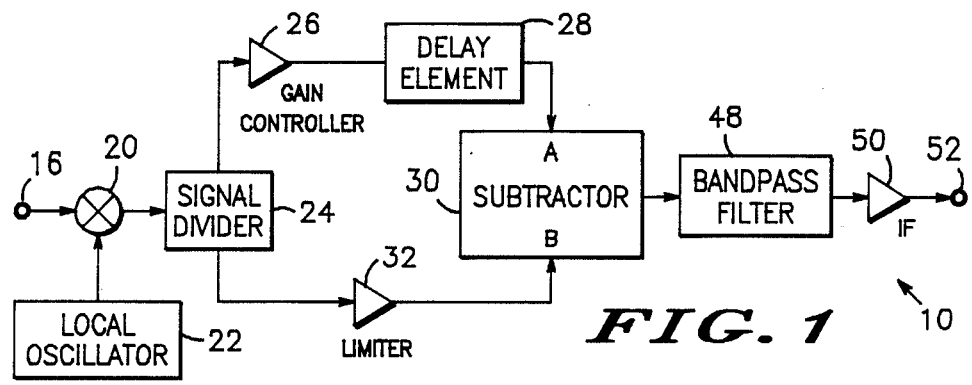
FIG. 1
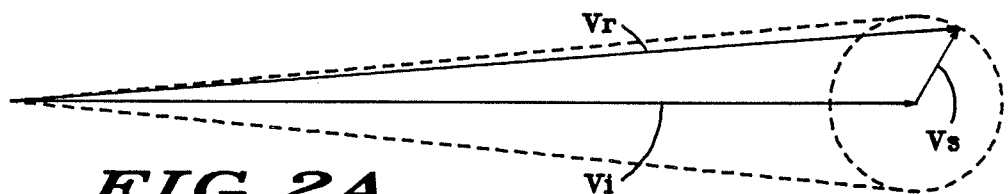
FIG. 2A
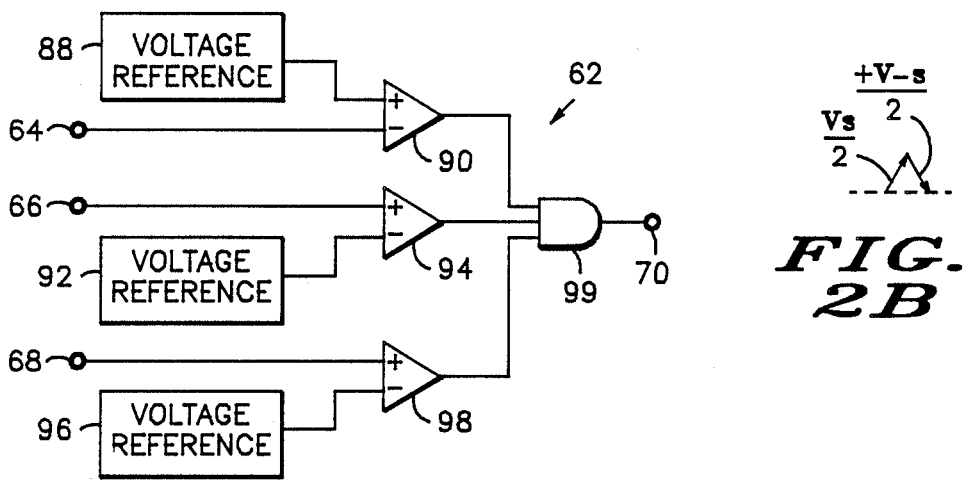
FIG. 5
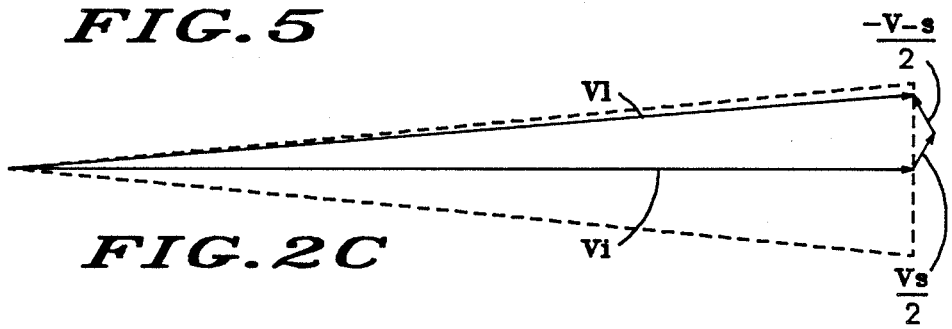
FIG. 2B
FIG. 2C

FIG. 4

| | INPUT STATE | | | INDICATORS | | | |
|---|---|---|---|---|---|---|---|
| | SWITCH SELECTION | INTERFERENCE LEVEL | SIGNAL LEVEL | WIDE BAND GAIN | NARROW BAND GAIN | SUPPRESSION OUTPUT | DECISION |
| 72 → | NO SUPPRESSION | LOW | LOW | HIGH | HIGH | LOW | NO SUPPRESSION |
| 74 → | NO SUPPRESSION | LOW | HIGH | LOW | LOW | LOW | NO SUPPRESSION |
| 76 → | NO SUPPRESSION | HIGH | LOW | LOW | HIGH | HIGH | SUPPRESSION |
| 78 → | NO SUPPRESSION | HIGH | HIGH | LOW | LOW | HIGH | NO SUPPRESSION |
| 80 → | SUPPRESSION | LOW | LOW | HIGH | HIGH | LOW | NO SUPPRESSION |
| 82 → | SUPPRESSION | LOW | HIGH | LOW | HIGH | LOW | NO SUPPRESSION |
| 84 → | SUPPRESSION | HIGH | LOW | LOW | HIGH | HIGH | SUPPRESSION |
| 86 → | SUPPRESSION | HIGH | HIGH | LOW | LOW | HIGH | NO SUPPRESSION |

RECEIVER INTERFERENCE SUPPRESSION SYSTEM

BACKGROUND OF THE INVENTION

This invention relates generally to receivers of angle modulated radio frequency (RF) signals. Specifically, this invention relates to distinguishing between a desired signal and an interfering signal. More specifically, the present invention relates to devices which distinguish a desired signal from an interfering signal which exhibits nearly the same frequency as the desired signal but significantly greater amplitude.

When received energy contains a strong interfering signal component compared to the amplitude of a desired signal component and the interfering signal exhibits a frequency nearly the same as the frequency of the desired signal, such as in an adjacent channel, conventional receivers may experience trouble in distinguishing the interfering signal from the desired signal. A conventional receiver may contain a crystal bandpass filter which is tuned to the frequency of the desired signal. Such a filter greatly attenuates signals at frequencies other than the frequency of the desired signal. For example, such a filter may attenuate an interfering signal located in an adjacent channel by 60 db. However, if an interfering signal in an adjacent channel exhibits an amplitude at least 60 db greater than the amplitude of the desired signal then the interfering signal dominates and operation of the receiver may be defeated.

Some prior art radios employ spectrum spreading and correlation techniques to minimize the influence of interfering signals. However, these circuits tend to be complicated and to involve both a transmitter and a receiver portion of the radio.

SUMMARY OF THE INVENTION

Accordingly, it is an object of the present invention to provide an improved radio receiver which utilizes a simple, effective, and inexpensive solution to the problem of distinguishing a desired signal from a strong interfering signal at a frequency nearly the same as the frequency of the desired signal.

Another object of the present invention concerns providing an improved interference suppression system which may be adapted only to a receiver portion of a radio.

Yet another object of the present invention concerns providing an improved interference suppression system which may augment interference suppression achieved through conventional techniques, such as the use of highly selective IF filters.

Still another object of the present invention concerns providing an improved interference suppression system through coherent differencing of equal amplitude limited and linearly amplified portions of a received signal.

The above and other objects and advantages of the present invention are carried out in one form by a receiver interference suppression system which includes a limiter, a gain controlled amplifier, and a subtractor. A received signal is applied to inputs of both the limiter and gain controlled amplifier. The amplitudes of a signal output from the limiter and a signal output from the gain controlled amplifier are adjusted to be approximately equal. In addition, both the limiter and the gain controlled amplifier produce substantially constant amplitude signals over time. The output of the limiter and the output of gain controlled amplifier couple to unique inputs of the subtractor.

BRIEF DESCRIPTION OF THE DRAWINGS

A more complete understanding of the present invention may be derived by reference to the detailed description and the claims when considered in connection with the accompanying drawings, in which like reference numbers indicate similar parts, and wherein:

FIG. 1 shows a block diagram of a first embodiment of the present invention;

FIG. 2A shows a phasor diagram of a received signal input to a limiter portion of the present invention;

FIG. 2B shows a phasor diagram of the amplitude variation of the received signal from FIG. 2A;

FIG. 2C shows a phasor diagram of a signal output from the limiter portion of the present invention;

FIG. 4 shows a table which defines the criteria used in operating a switch portion of the FIG. 3 embodiment of the present invention; and FIG. 5 shows one embodiment of a decision circuit portion of the present invention.

DETAILED DESCRIPTION OF THE PREFERRED EMBODIMENTS

Figure 3:
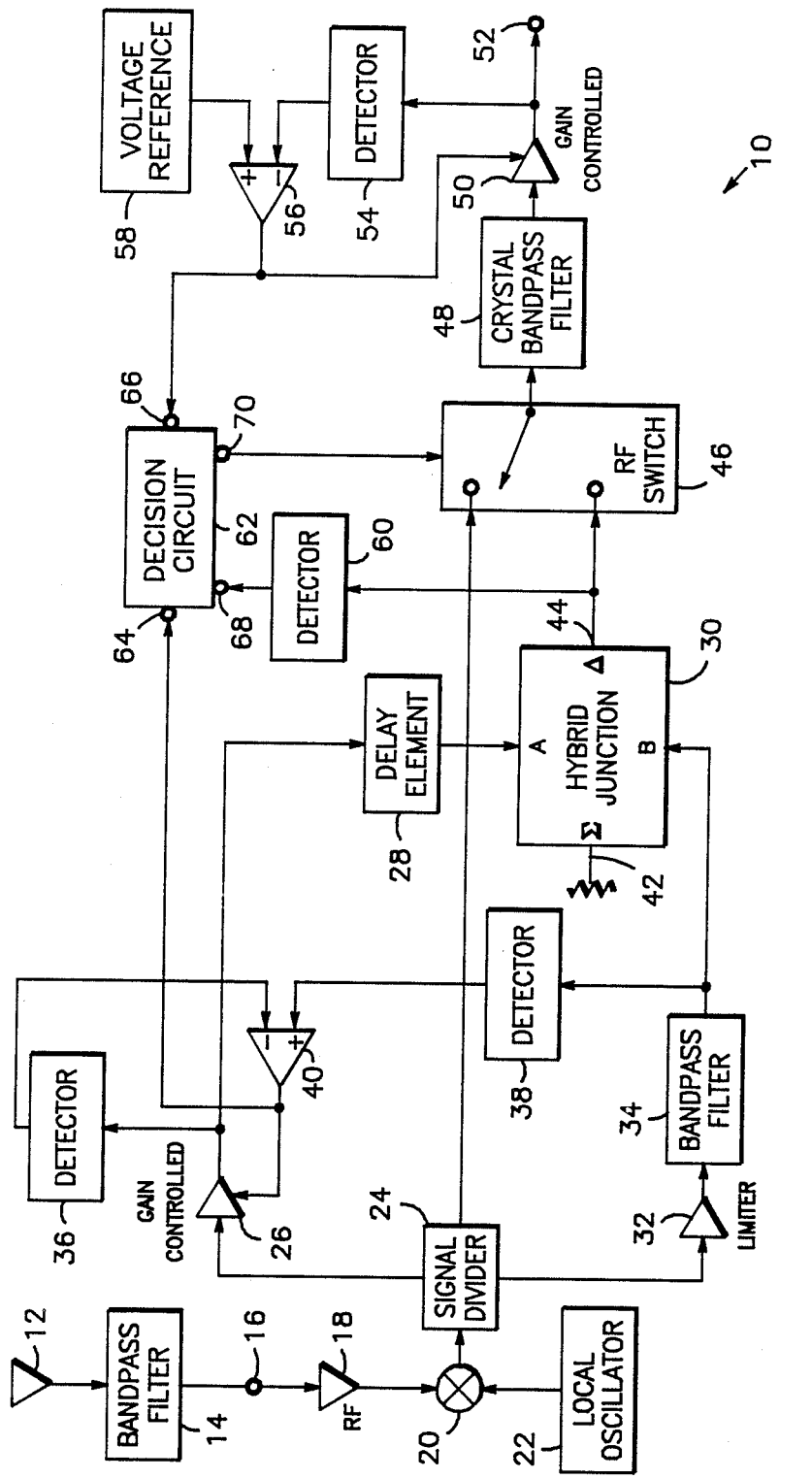
FIG. 3 shows a block diagram of a second embodiment of the present invention.

In FIG. 1, which shows a block diagram of one embodiment of a receiver 10, a received RF signal is applied to a terminal 16. Terminal 16 connects to a first input of a mixer 20. A local oscillator 22 has an output which connects to a second input of mixer 20. An output of mixer 20 provides a received IF signal and connects to an input port of a signal divider 24. Signal divider 24 has two ouputs each of which provide a signal exhibiting a relative phase, amplitude and power level which equals the phase, amplitude, and power level of the other output's signal. A first output port of signal divider 24 connects to a signal input of a gain controlled amplifier 26. An output of gain controlled amplifier 26 connects to an input of a delay element 28, and an output of delay element 28 connects to a first input of a subtractor 30. A second output port of signal divider 24 connects to an input of a limiter, or limiting amplifier, 32. An output of limiter 32 connects to a second input of subtractor 30. Subtractor 30 provides a difference signal at an output of subtractor 30 which couples to an input of a bandpass filter 48. An output of bandpass filter 48 couples to an input of an IF amplifier 50, and an output of IF amplifier 50 connects to a terminal 52.

The received RF energy applied at terminal 16 may contain both an interfering signal and a desired signal. The interfering signal may exhibit a substantially greater amplitude than the desired signal, but the interfering signal and the desired signal may exhibit nearly equal frequencies. Thus, a signal-to-interference ratio characterizes the received RF energy and represents the amplitude of the desired signal divided by the amplitude of the interfering signal. Mixer 20 down-converts the received RF energy into the received IF signal. The received IF signal preserves the signal-to-interference ratio of the received RF signal, and the frequencies of the desired and interfering signals remain nearly equal. Likewise, signal divider 24 preserves the signal-to-interference ratio and does not affect frequency components of the received IF signal.

FIG. 2A shows a phasor diagram of the received IF signal applied to the input of limiter 32. A $V_i$ phasor represents the interfering signal. All phasors represented in FIG. 2A are depicted relative to a coordinate system which rotates at the frequency of interfering signal $V_i$. Thus, phasor $V_i$ remains stationery.

Phasor $V_s$ represents the desired signal. In the phasor diagram of FIG. 2A, phasor $V_s$ rotates relative to phaser $V_i$ because the desired signal does not exhibit exactly the same frequency as interfering signal $V_i$. The frequency of rotation for phasor $V_s$ equals the difference in frequency between the desired signal and the interfering signal. Further, the direction of rotation, either CW or CCW, depends upon whether the frequency of the desired signal is greater or less than the frequency of the interfering signal.

Phasor $V_r$ represents the received IF signal and equals the sum of phasors $V_i$ and $V_s$. Accordingly, the received IF signal $V_r$ which is input to limiter 32 (see FIG. 1) may be expressed as:

$$V_r = V_i + V_s \qquad (1)$$

Additionally, received IF signal $V_r$ varies in both amplitude and phase as a result of the rotation of desired signal $V_s$ relative to interfering signal $V_i$.

Equation 1 may be rewritten as:

$$V_r = V_i + V_s/2 + V_s/2 + V_{-s}/2 - V_{-s}/2 \qquad (2)$$

Equation 2 splits the desired signal $V_s$ from equation 1 into four components. Each of the four components exhibits one-half the amplitude of $V_s$ from equation 1. If the two $V_{-s}$ components from equation 2 exhibit the same frequency relative to $V_i$ but opposite rotation as is exhibited by desired signal $V_s$, then all amplitude and phase variations of received IF signal $V_r$ are accounted for. The same frequency but opposite rotation condition occurs for a signal exhibiting an opposite polarity frequency relative to interfering signal $V_i$ as is exhibited by desired signal $V_s$. In other words, if the desired signal $V_s$ is higher in frequency than $V_i$, then signal $V_{-s}$ is lower in frequency than $V_i$, and vice-versa.

Further, the difference in frequency between the $V_{-s}$ signal and interfering signal $V_i$ equals the difference in frequency between desired signal $V_s$ and interfering signal $V_i$. Accordingly, $V_{-s}$ represents a complementary sideband of desired signal $V_s$ relative to interfering signal $V_i$.

Limiter 32 (see FIG. 1) represents a non-linear device which eliminates all amplitude variations in the signal presented to its input but preserves all phase variations. As shown in FIG. 2B, all amplitude variations in the received IF signal are represented by the components:

$$\text{Amplitude Variation of } V_r = V_s/2 + V_{-s}/2 \qquad (3)$$

Accordingly, limiter 32 (see FIG. 1) effectively subtracts equation 3 from equation 2 and multiplies the result by a gain factor A. Thus, limiter 32 produces a limited signal $V_1$ which may be expressed as:

$$V_1 = A(V_i + V_s/2 - V_{-s}/2) \qquad (4)$$

FIG. 2C shows a phasor diagram of limited signal $V_1$ assuming a gain factor $A = 1$. The magnitude of limited signal $V_1$ approximately equals the magnitude of interference signal $V_1$. The magnitude of limited signal $V_1$ does not precisely equal the magnitude of interference signal $V_i$ in FIG. 2C, but these magnitudes would be precisely equal if phasors representing higher order sidebands were shown. Further, when the signal-to-interference ratio is less than $-60$ db the desired signal $V_s$ is so small relative to interference signal $V_i$ that these higher order sidebands may be ignored.

Equations 1 and 4 reveal that the signal-to-interference ratio of limited signal V is one-half, or $-6$ db, of the signal-to-interference ratio of received IF signal $V_r$. Further, the relative power of desired signal $V_s$ for limited signal $V_1$ is one-fourth of the relative power of desired signal $V_s$ for received IF signal $V_r$. Another one-fourth of the desired signal's power resides in the $V_{-s}$ sideband of limited signal $V_1$, and the remaining one-half of the desired signal power has been eliminated by removal of all amplitude variation from received IF signal $V_r$.

Referring back to FIG. 1, gain controlled amplifier 26 linearly amplifies the received IF signal it receives from signal divider 24. Gain controlled amplifier 26 produces a constant amplitude output signal. Limiter 32 and gain controlled amplifier 26 may not have identical time delays. Therefore, the constant amplitude signal output from gain controlled amplifier 26 is delayed in delay element 28 and applied to the first input of subtractor 30 so that it arrives at subtractor 30 simultaneously with the arrival of the limited signal at the second input of subtractor 30. Delay element 28 represents a conventional delay element component known to those skilled in the art and need not be discussed in detail herein. The connection of delay element 28 in FIG. 1 presumes that limiter 32 has more time delay than amplifier 26. However, in some applications gain control amplifier 26 may have more time delay than limiter 32. In this case, delay element 28 would be connected between limiter 32 and subtractor 30 rather than between gain controlled amplifier 26 and subtractor 30.

Since gain controlled amplifier 26 linearly amplifies the received IF signal, no significant change in the signal-to-interference ratio or frequency components between interfering and desired signals occurs. Accordingly, the constant amplitude signal which gain controlled amplifier 26 applies to the first input of subtractor 30 reflects the received IF signal times a gain factor. This gain factor is adjusted so that the amplitude of the interference signal component of the signal applied at the first input of subtractor 30 substantially equals the amplitude of the interference signal component of the limited signal applied at the second input of subtractor 30.

Subtractor 30 operates to subtract the signal presented at one of its inputs from the signal presented at the other of its inputs. In the present embodiment, subtractor 30 may operate on either the power, voltage, or current of the signals. Consequently, the output of subtractor 30 provides a difference signal in which the interference signal portion of the limited signal cancels the interference signal portion of the constant amplitude signal. Additionally, the desired signal exhibits an amplitude equal to the difference in amplitudes between the desired signal portion of the constant amplitude and limited signals. Further, the difference signal contains another signal component corresponding to the sideband $V_{-s}$ described above in connection with FIG. 2.

As a practical matter subtractor 30 may not precisely cancel interfering signal components of the limited and constant amplitude signals. Nevertheless, subtractor 30 operates to greatly attenuate this interfering signal. Bandpass filter 48 allows the desired signal to pass unattenuated but attenuates all other frequency components. Thus, bandpass filter 48 attenuates remaining portions of interfering signal $V_i$ and sideband signal $V_{-s}$. At the output of bandpass filter 48, the desired signal now represents the frequency component having the greatest amplitude. It is amplified in IF amplifier 50 and passed to terminal 52 for further signal conditioning, such as may occur in a demod (not shown).

In summary, receiver 10 in the present invention generates first and second coherent signals through the operation of signal divider 24. Gain controlled amplifier 26 linearly amplifies the first of the coherent signals, and limiter 32 performs a non-linear, limiting operation on the second of the coherent signals. Subtractor 30 produces the difference between the linearly amplified and limited coherent signals to greatly reduce the interfering portion of the received signal while only slightly affecting the desired portion of the received signal.

In FIG. 3, a second embodiment of the present invention is shown. Like reference numbers between FIGS. 1 and 3 represent similar parts. In FIG. 3, an antenna 12 receives an RF signal and connects to an input of a bandpass filter 14. An output of bandpass filter 14 couples to terminal 16 and to an input of an RF amplifier 18. An output of RF amplifier 18 couples to the first input of mixer 20. Bandpass filter 14 and RF amplifier 18 operate to condition the received RF signal and define the signal-to-noise ratio of receiver 10. Local oscillator 22 couples to the second input of mixer 20, and the output of mixer 20 couples to a 3-way power divider 24. As discussed above in connection with FIG. 1, the received IF signal which mixer 20 supplies to the input port of power divider 24 may contain both interference and desired signal components. Furthermore, power divider 24 provides equal power and equal phase signals at each of its three output ports. A first output port of power divider 24 connects to a signal input of gain controlled amplifier 26. The output of gain control amplifier 26 connects to an input of a detector 36 and to the input of delay element 28. The output of delay element 28 connects to a first input port of a hybrid junction 30. The second output port of power divider 24 connects to the input of limiter 32, and the output of limiter 32 connects to an input of a bandpass filter 34. The output of bandpass filter 34 connects to an input of a detector 38 and to a second input port of hybrid junction 30. Hybrid junction 30 represents a sum and difference hybrid which provides a difference in the power between signals applied at the first and second input ports at a difference output port. A sum port 42 is terminated in a characteristic impedance. Thus, hybrid junction 30 in FIG. 3 performs the function of subtractor 30 shown in FIG. 1.

An output from detector 36 couples to an inverting input of a difference amplifier 40, and an output of detector 38 couples to a non-inverting input of difference amplifier 40. An output of difference amplifier 40 couples to a gain control input of gain controlled amplifier 26, a terminal 64, and a first input of a decision circuit 62. Difference output 44 of hybrid junction 30 connects to an input of a detector 60, and an output of detector 60 couples to a terminal 68 and a third input of decision circuit 62. A third output port of power divider 24 couples to a first input port of an RF switch 46, and difference output 44 of hybrid junction 30 couples to a second input port of RF switch 46. An output port of RF switch 46 couples to an input of a crystal bandpass filter 48, and an output of crystal bandpass filter 48 couples to a signal input of a gain controlled IF amplifier 50. An output of amplifier 50 couples to terminal 52 and to an input of a detector 54. An output of detector 54 couples to an inverting input of a difference amplifier 56, and an output of a voltage reference 58 couples to a non-inverting input of difference amplifier 56. An output of difference amplifier 56 couples to a gain control input of gain controlled IF amplifier 50, a terminal 66, and to a second input of decision circuit 62. An output of decision circuit 62 couples to a terminal 70 and a control input of RF switch 46.

Power divider 24, gain control amplifier 26, delay element 28, hybrid junction 30, and limiter 32, cooperate substantially as described above in connection with FIG. 1. However, in the present embodiment hybrid junction 30 produces a difference signal which reflects the difference in power between the signals presented on the first and second input ports of hybrid junction 30. As described above in connection with FIG. 2C, the limited signal which is applied to the second input port of hybrid junction 30 contains a desired signal power level which is one-fourth of the desired signal power level of the constant amplitude signal provided at the first input port of hybrid junction 30. Consequently, the desired signal presented at difference output 44 of hybrid junction 30 contains three-fourths of the relative power level in the desired signal frequency as was contained in the received IF signal. This represents a reduction of only 1.25 db.

The present embodiment additionally contains a circuit for controlling the gain of gain controlled amplifier 26. Thus, bandpass filter 34 tends to convert the limited signal output from limiter 32 into a sine wave, and detector 38 provides an analog signal which denotes the amplitude of the limited signal. Detector 38 may advantageously represent a peak detector or other type of detector which produces an analog signal proportional to the amplitude of an IF signal. Likewise, detector 36 provides a signal at its output which is proportional to the amplitude of the constant gain signal produced at the output of gain controlled amplifier 26.

A feedback loop is formed between gain controlled amplifier 26, detector 36 and difference amplifier 40. The components of this feedback loop are adjusted so that equilibrium occurs when the interfering signal component of the constant amplitude signal applied at the first port of hybrid junction 30 equals the interfering signal component of the limited signal applied at the second port of hybrid junction 30. As a received IF signal decreases in amplitude, the signal detected in detector 36 likewise decreases in amplitude, causing the output of difference amplifier 40 to increase in amplitude and the gain of gain control amplifier 26 to increase. Equilibrium will again be established when the interfering signal components applied to the first and second input ports of hybrid junction 30 are equal.

The present embodiment also utilizes an automatic gain control circuit in connection with amplifier 50. Greater signal level at the gain control input of amplifier 50 causes a greater gain for amplifier 50. Thus, detector 54 detects the level of the signal output by amplifier 50, and amplifier 56 produces an inverted output signal proportional to its input signal.

The present embodiment selects whether or not to utilize the difference signal provided by difference output port 44 of hybrid junction 30. When RF switch 46 connects the first input port to the output port, no interference suppression due to operation of hybrid junction 30 occurs. In this mode crystal bandpass filter 48, which represents a conventional high-Q filter tuned to the frequency of the desired signal, effectively eliminates any interfering signals. However, when the amplitude and frequency of interfering signals reaches levels where crystal bandpass filter 48 cannot effectively remove the interfering signal, RF switch 46 connects its second input port to its output port. Only in this mode is the difference signal generated by hybrid junction 30 utilized.

Decision circuit 62 monitors the gain at which gain control amplifiers 26 and 50 operate in order to determine the proper state for RF switch 46. FIG. 4 shows a table which defines the input states which receiver 10 may experience, the indicators used by decision circuit 62 to determine the proper state for RF switch 46, and the resulting state of switch 46. In the present embodiment crystal bandpass filter 48 effectively removes interfering signals in adjacent channels which are up to 60 db greater in amplitude than the desired signal. Accordingly, RF switch 46 need not select the interference suppression output from hybrid junction 30 unless an interfering signal in an adjacent channel is more than 60 db greater than the power of the desired signal.

In fact, it is advantageous to refrain from selecting the interference suppression output when the interfering signal is not significantly greater than the desired signal. Otherwise, the assumptions made above in connection with FIG. 2 do not remain valid, and hybrid junction 30 may significantly attenuate the desired signal rather than the interfering signal. Accordingly, decision circuit 62 selects the interference suppression signal generated by hybrid junction 30 only when the interfering signal level is relatively high and the desired signal level is relatively low. This condition is indicated in states, or rows, 76 and 84 of FIG. 4.

In determining whether the interference level is relatively high and the signal level is relatively low, the gain control input signal to gain controlled amplifiers 26 and 50 are monitored. These gain control input signals reflect a wide band gain and a narrow band gain, respectively. The gain control signal for gain controlled amplifier 26 represents wide band gain because gain control amplifier 26 monitors the received IF signal prior to filtering by crystal bandpass filter 48. Similarly, the gain control signal for gain controlled amplifier 50 represents a narrow band gain because gain controlled amplifier 50 operates on a signal which is output from crystal bandpass filter 48.

Consequently, whenever both the interference and desired signals exhibit relatively low levels both the wideband and narrow band gains are relatively high, and RF switch 46 selects not to use the interference suppression signal from hybrid junction 30 regardless of which state RF switch 46 may currently be in, as shown in rows 72 and 80 of FIG. 4. Likewise, when both the interference and desired signal exhibit relatively high levels, both the wideband gain and narrow band gain are relatively low, and again RF switch 46 selects not to use the interference suppression signal from hybrid junction 30 regardless of the current state of RF switch 46 (see rows 78 and 86). Only when the interference signal is relatively high while the desired signal is relatively low will decision circuit 62 choose to select the interference suppression signal from hybrid junction 30. This situation occurs regardless of the current state of RF switch 46, as shown by rows 76 and 84. In this state the wideband gain is relatively low while the narrow band gain is relatively high.

When the interference signal level is relatively low while the desired signal level is relatively high, decision circuit 62 causes switch 46 to select the output from power divider 24 rather than the output from hybrid junction 30, as shown in rows 74 and 82. However, for this situation the wideband gain and narrow band gain indicators vary depending on the current state of RF switch 46. Specifically, when RF switch 46 currently chooses no suppression, wideband gain is low while narrow band gain is also low. But, when RF switch 46 selects to use the suppressed signal, wideband gain is low while narrow band gain is high. Consequently, the wideband and narrow band gain indicators alone cannot distinguish between the states indicated in rows 82 and 84.

It is unlikely that decision circuit 62 will transistion between states 84 and 82 because this requires a simultaneous change in both desired signal level and interference level. However, the suppression output from hybrid junction 30 is also monitored by decision circuit 62 through detector 60 to further differentiate between states 82 and 84. Accordingly, in state 82, where the interference signal is low but the desired signal level is high the amplitude of the signal output from hybrid junction 30 will be relatively low. Conversely, in state 84, where the interference signal is relatively high the desired signal is relatively low, the amplitude of the signal output from hybrid junction 32 is relatively high.

In summary, for many situations the wideband gain and narrow band gain indicators uniquely identify the one state where it is desired to select the output from the hybrid junction in RF switch 46. However, to insure that decision circuit 62 may successfully transistion between any of states 72-86, decision circuit 62 may advantageously monitor the difference signal produced by hybrid junction 30.

FIG. 5 shows one embodiment of decision circuit 62 which carries out the instructions presented in the table of FIG. 4. In FIG. 5, terminal 64 connects to an inverting input of a comparator 90, and a voltage reference 88 has an output which connects to a non-inverting input of comparator 90. Terminal 66 connects to a non-inverting input of a comparator 94, and an output of a voltage reference 92 connects to an inverting input of comparator 94. Terminal 68 connects to a non-inverting input of a comparator 98, and an output of a voltage reference 96 connects to an inverting input of comparator 98. An output of comparator 90 connects to a first input of AND gate 99, an output of comparator 94 connects to a second input of AND gate 99, and an output of comparator 98 connects to a third input of AND gate 99. An output of AND gate 99 connects to terminal 70.

Terminal 64 monitors the wideband gain indicator, terminal 66 monitors the narrow band gain indicator, and terminal 68 monitors the difference output signal from hybrid junction 30. Each of comparators 90, 94, and 98 generate a digital signal which exhibits one of two possible logical states. Voltage references 88, 92, and 96 are set to predetermined levels. The predetermined levels at which voltage references 88, 92 and 96 are adjusted determine the transistion points above and below which the wideband gain, narrow band gain, and difference output may be considered high or low as discussed above in connection with FIG. 4. Accordingly, the decision circuit described in FIG. 5 causes switch 46 (see FIG. 3) to connect the difference signal from hybrid junction 30 to the input of crystal bandpass filter 48 when the wideband gain is less than a first predetermined value, the narrow band gain is greater than a second predetermined value, and the difference input signal is greater than a third predetermined value.

The foregoing description uses preferred embodiments to illustrate the present invention. However, those skilled in the art will recognize that changes and modifications may be made in these embodiments without departing from the scope of the present invention. For example, the various polarities of gain control signals described above may be reversed. Additionally, in some applications RF switch 46 may be replaced by a manually operated switch and decision circuit 62 may not be needed. These and other changes and modifications obvious to those skilled in the art are intended to be included within the scope of this invention.

We claim:

1. A receiver interference supression system comprising:
   a terminal at which a received signal is applied;
   a limiter having an input and an output, said limiter input being coupled to said terminal, and said limiter output being for providing a limited signal at a predetermined level;
   a gain controlled amplifier having a signal input, a gain control input, and an output, said amplifier signal input being coupled to said terminal, and said amplifier output being for providing a constant amplitude signal at approximately the predetermined level;
   a subtractor having first and second inputs, said subtractor first input being coupled to said limiter output, and said subtractor second input being coupled to said amplifier output;
   a first means, having an input coupled to the output of said limiter and having an output, for detecting the level of the limited signal;
   a second means, having an input coupled to the output of said gain controlled amplifier and having an output, for detecting the level of the constant amplitude signal; and
   a difference amplifier having first and second inputs and an output, the first input of said difference amplifier being coupled to the output of said first detecting means, the second input of said difference amplifier being coupled to the output of said second detecting means, and the output of said difference amplifier being coupled to the gain control input of said gain controlled amplifier.

2. A receiver interference suppression system as claimed in claim 1 additionally comprising:
   an RF amplifier having an input coupled to said terminal and having an output;
   a mixer having an input coupled to the output of said RF amplifier and having an output; and
   a signal divider having an input port coupled to the output of said mixer, a first output port coupled to the input of said limiter, and a second output port coupled to the signal input of said gain controlled amplifier.

3. A receiver interference suppression system as claimed in claim 2 wherein said subtractor represents a sum and difference hybrid junction.

4. A receiver interference suppression system as claimed in claim 1 additionally comprising a delay element coupled in series with one of said subtractor first and second inputs.

5. A receiver interference suppression system as claimed in claim 1 additionally comprising a band pass filter having an input coupled to the output of said limiter and having an output coupled to the input of said first detecting means.

6. A receiver interference suppression system comprising:
   a terminal at which a received signal is applied;
   a limiter having an input and an output, said limiter input being coupled to said terminal, and said limiter output being for providing a limited signal at a predetermined level;
   a gain controlled amplifier having a signal input and an output, said amplifier signal input being coupled to said terminal, and said amplifier output being for providing a constant amplitude signal at approximately the predetermined level;
   a subtractor having first and second inputs and an output, said subtractor first input being coupled to said limiter output, and said subtractor second input being coupled to said amplifier output;
   a switch having first and second signal input ports, a signal output port and a control input, said switch first signal input port being coupled to said terminal, and said switch second signal input port being coupled to said subtractor output; and
   means, coupled between said gain controlled amplifier and said switch control input, for selecting when said switch connects the second input port to said switch output port.

7. A receiver interference suppression system as claimed in claim 6 additionally comprising:
   a crystal bandpass filter having an input coupled to the output port of said switch and having an output; and
   a second gain controlled amplifier having a signal input coupled to the output of said crystal bandpass filter and a gain control input coupled to said selecting means.

8. A receiver interference suppression system as claimed in claim 7 wherein said means for selecting comprises:
   a first comparator having an input coupled to said gain controlled amplifier and having an output which exhibits one of two possible logical states;
   a second comparator having an input coupled to said second gain controlled amplifier and having an output which exhibits one of two possible logical states; and
   means, coupled to the outputs of said first and second comparators and to the control input of said switch, for connecting the second input port to the output port of said switch when said gain controlled amplifier exhibits a gain which is less than a first predetermined gain, and said second gain controlled amplifier exhibits a gain which is greater than a second predetermined gain.

9. A receiver interference suppression system as claimed in claim 8 additionally comprising a third comparator having an input coupled to said subtractor output and having an output coupled to said connecting means which exhibits one of two possible logical states and wherein:
   said subtractor output provides a difference signal; and said connecting means connects the second input port to the output port of said switch only when the difference signal is greater than a third predetermined level.

10. A method of attenuating a portion of a received signal, the method comprising the steps of:
applying the received signal to an input of a gain controlled amplifier which provides a constant amplitude signal;
applying the received signal to an input of a limiting amplifier which provides a limited signal;
detecting the amplitude of the constant amplitude signal;
detecting the amplitude of the limited signal;
determining the difference between the amplitude of the constant amplitude signal and the amplitude of the limited signal;
controlling the gain of the gain controlled amplifier in response to the difference determined in said determining step so that an amplitude parameter of an interference portion of the constant amplitude signal approximately equals an amplitude parameter of the interference portion of the limited signal; and
subtracting one of the constant amplitude and limited signals from the other of the constant amplitude and limited signals.

11. A method as claimed in claim 10 additionally comprising the step of delaying one of the constant amplitude and limited signals relative to the other of the constant amplitude and limited signals prior to said subtraction step.

12. A method as claimed in claim 10 wherein said subtracting step produces a difference signal which is applied to a second port of a switch, and the method additionally comprises the steps of:
applying the received signal to a first port of the switch;
monitoring a gain parameter of the gain controlled amplifier; and
causing the switch to select one of the first and second ports in response to the gain monitored in said monitoring step.

13. A method as claimed in claim 12 additionally comprising the steps of:
generating a filtered signal from the difference signal so that a ratio of an amplitude for frequency components outside of a predetermined band of frequencies to an amplitude for frequency components within the predetermined band of frequencies is less for the filtered signal than for the difference signal;
monitoring an amplitude parameter of the filtered signal;
comparing the gain monitored in said gain monitoring step with a predetermined gain;
comparing the amplitude of the filtered signal monitored in said amplitude monitoring step with a predetermined amplitude; and
selecting the second port of the switch when said gain comparing step indicates a gain less than the predetermined gain and the amplitude comparing step indicates an amplitude greater than the predetermined amplitude.

14. A method as claimed in claim 13 wherein:
the method additionally comprises the step of comparing an amplitude parameter of the difference signal with a second predetermined amplitude; and
said selecting step selects the second port of the switch only when the amplitude of the difference signal is greater than a second predetermined amplitude.

15. A receiver interference suppression system comprising:
a terminal at which a received signal is applied;
a limiter having an input and an output, said limiter input being coupled to said terminal;
a gain controlled amplifier having signal and gain control inputs and an output, said gain controlled amplifier signal input being coupled to said terminal;
a subtractor having first and second inputs and an output, said subtractor first input being coupled to said limiter output, and said subtractor second input being coupled to said gain controlled amplifier output;
a difference amplifier having first and second inputs and an output, the first input of said difference amplifier being coupled to the output of said limiter, the second input of said difference amplifier being coupled to the output of said gain controlled amplifier, and the output of said difference amplifier being coupled to the gain control input of said gain controlled amplifier;
a switch having first and second signal input ports, a signal output port, and a control input, said switch first signal input port being coupled to said terminal, and said switch second signal input port being coupled to said subtractor output; and
means, coupled between said gain controlled amplifier output and said switch control input, for selecting when said switch connects the second input port to said switch output port.

16. A receiver interference suppression system as claimed in claim 15 additionally comprising:
a bandpass filter having an input coupled to the output port of said switch and having an output; and
a gain controlled amplifier having a signal input coupled to the output of said bandpass filter and a gain control input coupled to said selecting means.

* * * * *